United States Patent
Schuring

(10) Patent No.: US 11,241,762 B2
(45) Date of Patent: Feb. 8, 2022

(54) METHOD AND SYSTEM FOR ESTABLISHING A SECTIONAL OR MODULAR WIND TURBINE BLADE AND A MOBILE FACTORY FOR JOINING SECTIONS OF A WIND TURBINE BLADE

(71) Applicant: LM WIND POWER US TECHNOLOGY APS, Kolding (DK)

(72) Inventor: Roelof Willem Schuring, Enschede (NL)

(73) Assignee: LM WIND POWER US TECHNOLOGY APS, Kolding (DK)

( * ) Notice: Subject to any disclaimer, the term of this patent is extended or adjusted under 35 U.S.C. 154(b) by 148 days.

(21) Appl. No.: 16/462,687

(22) PCT Filed: Nov. 21, 2017

(86) PCT No.: PCT/EP2017/079912
§ 371 (c)(1),
(2) Date: May 21, 2019

(87) PCT Pub. No.: WO2018/091735
PCT Pub. Date: May 24, 2018

(65) Prior Publication Data
US 2019/0299343 A1    Oct. 3, 2019

(30) Foreign Application Priority Data
Nov. 21, 2016   (EP) .................................. 16199849

(51) Int. Cl.
*B23P 15/04*       (2006.01)
*F03D 13/10*      (2016.01)
(Continued)

(52) U.S. Cl.
CPC ............ *B23P 15/04* (2013.01); *F03D 1/0675* (2013.01); *F03D 13/10* (2016.05); *F03D 13/40* (2016.05);
(Continued)

(58) Field of Classification Search
CPC ........ B23P 15/04; F03D 13/10; F03D 1/0675; F03D 13/40; F05B 2220/30;
(Continued)

(56) References Cited

U.S. PATENT DOCUMENTS

2007/0248431 A1* 10/2007 Jensen ...................... B60P 3/40
                                                          410/45
2010/0143062 A1*  6/2010 Tobergte ................. F03D 13/10
                                                          410/44
2011/0142660 A1*  6/2011 Bakhuis .................... B60P 3/40
                                                         416/223 R

FOREIGN PATENT DOCUMENTS

DE        102008055540 A1    6/2009
EP              2497686 A1 *  9/2012 ............. F03D 13/40
(Continued)

*Primary Examiner* — Lee A Holly
(74) *Attorney, Agent, or Firm* — Nath, Goldberg & Meyer; Jerald L. Meyer; Tanya E. Harkins

(57) ABSTRACT

The invention relates to a method for establishing a sectional or modular wind turbine blade. The method comprises the steps of transporting at least two blade sections of said wind turbine blade and a mobile factory for joining blade sections to a location at or in proximity of a wind turbine site, positioning said blade sections with two blade section ends facing each other and supported on a platform in said mobile factory, moving said platform in relation to the ground at the location for levelling said platform, aligning said blade section ends in relation to each other, and establishing said sectional or modular wind turbine blade by joining blade sections in an area of connection at said blade section ends.

(Continued)

The invention also relates to a system for establishing a sectional or modular wind turbine blade and a mobile factory for joining sections of a wind turbine blade.

4 Claims, 8 Drawing Sheets

(51) Int. Cl.
 *F03D 13/40* (2016.01)
 *F03D 1/06* (2006.01)
(52) U.S. Cl.
 CPC ..... *F05B 2220/30* (2013.01); *F05B 2230/604* (2013.01); *F05B 2230/61* (2013.01); *F05B 2240/221* (2013.01); *F05B 2240/302* (2013.01); *Y02E 10/72* (2013.01)
(58) Field of Classification Search
 CPC ............ F05B 2230/604; F05B 2230/61; F05B 2240/221; F05B 2240/302
 See application file for complete search history.

(56) References Cited

FOREIGN PATENT DOCUMENTS

| | | | |
|---|---|---|---|
| WO | 2006002621 | A1 | 1/2006 |
| WO | 2010135737 | A1 | 11/2010 |

\* cited by examiner

METHOD AND SYSTEM FOR ESTABLISHING A SECTIONAL OR MODULAR WIND TURBINE BLADE AND A MOBILE FACTORY FOR JOINING SECTIONS OF A WIND TURBINE BLADE

This is a National Phase Application filed under 35 U.S.C. 371 as a national stage of PCT/EP2017/079912, filed Nov. 21, 2017, an application claiming the benefit of European Application No. 16199849.7, filed Nov. 21, 2016, the content of each of which is hereby incorporated by reference in its entirety.

FIELD OF THE INVENTION

The invention relates to a method and system for establishing a sectional or modular wind turbine blade and a mobile factory for joining sections of a wind turbine blade.

BACKGROUND OF THE INVENTION

Wind turbine blades often have a significant size making them challenging to handle during manufacturing of the blades and in transportation from the manufacturing plant to a wind turbine site. The length of a modern wind turbine blade may for example be more than 80 meters.

The use of sectional or modular wind turbine blades makes it easier to handle large wind turbine blades. International patent application no. 2015/189338 discloses a method for manufacturing a modular wind turbine blade with a robust and durable joint of separate blade sections such as a tip, mainboard and/or root sections of the wind turbine blade.

International patent application no. 2006/002621 discloses an assembly plant for assembling two blade sections into a sectional wind turbine blade. The plant may be located in a place different from the manufacturing place of the wind turbine blade sections such as the place of erecting a wind turbine. The assembly plant comprises a number of actuators for moving the ends of the wind turbine blade sections. Actuators are located on the ground and align the blade sections in a horizontal plane controlled by position lasers. Other actuators push the blade section ends together in an adhesive connection after the alignment.

However, large sectional or modular wind turbine blades require a more precise and well-defined assembly plant and method than provided in international patent application no. 2006/002621 to ensure the necessary strength of the assembled wind turbine blades. The requirement is especially necessary to ensure an exact and similar strength in the sectional joints of wind turbine blades in a wind turbine rotor.

It is an object of the invention to provide an improved method and system for establishing a sectional or modular wind turbine blade as well as a mobile factory which seek to reduce these problems.

SUMMARY OF THE INVENTION

The invention relates to a method for establishing a sectional or modular wind turbine blade, said method comprises the steps of:
transporting at least two blade sections of said wind turbine blade and a mobile factory for joining blade sections to a location at or in proximity of a wind turbine site,
positioning said blade sections with two blade section ends facing each other and supported on a platform in said mobile factory,
moving said platform in relation to the ground at the location for levelling said platform,
aligning said blade section ends in relation to each other, and
establishing said sectional or modular wind turbine blade by joining blade sections in an area of connection at said blade section ends.

Hereby, it is achieved a method for establishing strong and exact sectional or modular wind turbine blades as the method is performed for each blade on a leveled, well-defined and stable platform in the mobile factory.

The term "mobile factory" should be understood as a transportable workshop with an area or housing on a location in which blade section joint or other forms of work are carried out on the wind turbine blade by one or more work persons.

The term "wind turbine site" means a location, where a wind turbine or multiple wind turbines are erected.

Ideally, the mobile factor is moved to the wind turbine site. This may not always be possible. For example, the wind turbines to be erected may be off-shore wind turbines. In this case, the mobile factory may advantageously be placed at a location close to the harbour from which the finished blades are to be shipped to the wind turbine site.

There may be other cases, where the mobile factory is moved to a location proximal to the wind turbine site. In this context, the term "proximity" is to be understood broadly. For example, a mobile factory placed several hundred kilometres from the wind turbine site may still be proximal to the site when compared to the location of the nearest blade manufacturing facility that may be thousand kilometres away.

Due to the significant costs related to blade transportation both on land and on the sea, especially for longer blades of more than 50 or 60 or even 70 metres of length, there may be a major cost advantage associated to transporting shorter blade sections when compared to whole blades, even if the mobile factory is moved to a location somewhere between the blade manufacturing facility and the wind turbine site and not all the way to the wind turbine site.

The term "platform" should be understood as a floor able to support, level and/or move blade sections above the ground at a location. The platform should also be able to support and move any work persons and relevant tools necessary on the platform for connecting the blade sections.

Preferably, said platform is moved by one or more platform support actuators connected to the platform while standing on the ground. The use of support actuators ensures that the platform may be perfectly leveled before any alignment processes are performed on the blade sections supported on the platform.

Preferably, said blade section ends are supported on said platform by support cradles. Hereby is ensured that the blade sections are securely grabbed and supported on the platform before the platform is leveled and the ends of the blade sections are aligned.

Preferably, said blade section ends are aligned by rotating, lifting and/or lowering said support cradles. Hereby is it ensured that the blade sections of every sectional or modular wind turbine blade are aligned exactly correct in establishing a strong joint between the blade sections.

The invention also relates to a system for establishing a sectional or modular wind turbine blade, said system comprising:

one or more manufacturing plants for manufacturing at least two blade sections of said sectional or modular wind turbine blade, one or more transporting vehicles for transporting said at least two blade sections of said wind turbine blade and at least one mobile factory for joining blade sections to a location at or in proximity of a wind turbine site, and lifting means for positioning blade sections with two blade section ends facing each other in said mobile factory, wherein said mobile factory includes a platform for supporting blade sections with two blade section ends facing each other in an area of connection and said platform is moveable in relation to the ground at the location.

Hereby is achieved an advantageous system for establishing a sectional or modular wind turbine blade.

Preferably, said sectional or modular wind turbine blade comprises a tip and root blade section, a tip, mainboard and root blade section or even further blade sections. Hereby is an advantageous embodiment of the invention achieved.

The blade sections may be manufactured at the same blade manufacturing facility or, for example, the tip sections may be manufactured at one facility and the root sections may be manufactured at a different facility. In that way, specialized manufacturing facilities may be utilized.

Furthermore, if, for example, the tip sections have a shorter length than the other section(s), the tip sections may comparatively easily and comparatively cost effectively be transported to the mobile factory at or in the proximity of the wind turbine site. Therefore, a specialized blade tip section manufacturing site may provide tip sections for assembly with other sections at various wind turbine sites, even if the specialized blade tip section manufacturing site is more distant from the wind turbine site, because transport costs may not be too high for such a setup.

It may be beneficial to use identical and effectively produced blade sections in different blades. For example, the same blade tip section may be joined to different root sections, making a centralized manufacturing of such blade tip sections even more attractive due to the higher number of more or less identical parts. In this way, at least part of the wind turbine blade production, for example, the production of blade tip sections may be more effectively automized.

Preferably, said mobile factory comprises one or more containers such as a standard shipping container. The use of a container for enclosing the area of connection between the ends of two blade sections may provide a well-defined work space during the alignment and joining of the blade sections as well as health, security and environmental measures for any work persons within the work space.

Preferably, said mobile factory comprises a container floor as said platform and container wall openings for receiving ends of said at least two blade sections. The container provides a durable closed steel box enclosing the area of connection between the blade sections. Further, the rigid container steel floor also provides necessary strength in the platform to ensure no permanent deformation of the platform during use regardless of the weight of the blade sections, support cradles, tools and work persons.

Preferably, the ends of said blade sections are supported on said platform by at least two support cradles. Hereby is ensured that the blade sections are securely grabbed and supported on the platform before the platform is leveled and the ends of the blade sections are aligned.

Preferably, said support cradles include hydraulic or electric actuators or jack-ups for lifting, lowering and/or rotating the ends of said blade sections. Hereby are provided the necessary means in fine positioning the ends of said blade sections during the alignment process.

Preferably, said system includes a positioning system for controlling said platform support actuators and said support cradles. The positioning system provides an advantageous central control of the different means in the system such as support actuators and support cradles as well as any measuring sensors for the levelling and alignment processes.

The invention also relates to a mobile factory for joining sections of a wind turbine blade, the factory comprising a platform adapted to support wind turbine blade sections of a sectionized wind turbine blade at the area of connection of a joint between the wind turbine blade sections, wherein the platform is horizontally and vertically movable with respect to the ground to facilitate alignment of the wind turbine blade sections to be joined.

Hereby is achieved an advantageous mobile factory able of being transported to a location at or in proximity of a wind turbine site and establishing a workspace for joining blade sections into a wind turbine blade.

Preferably, said factory comprises cradles or clamps mounted on said platform to receive said wind turbine blade sections, in order to achieve an advantageous embodiment of the invention.

THE FIGURES

An embodiment of the invention will now be described, by way of example only, with reference to the accompanying drawings, which will be understood to be illustrative only, and are not provided to scale.

DETAILED DESCRIPTION

Figure 1:
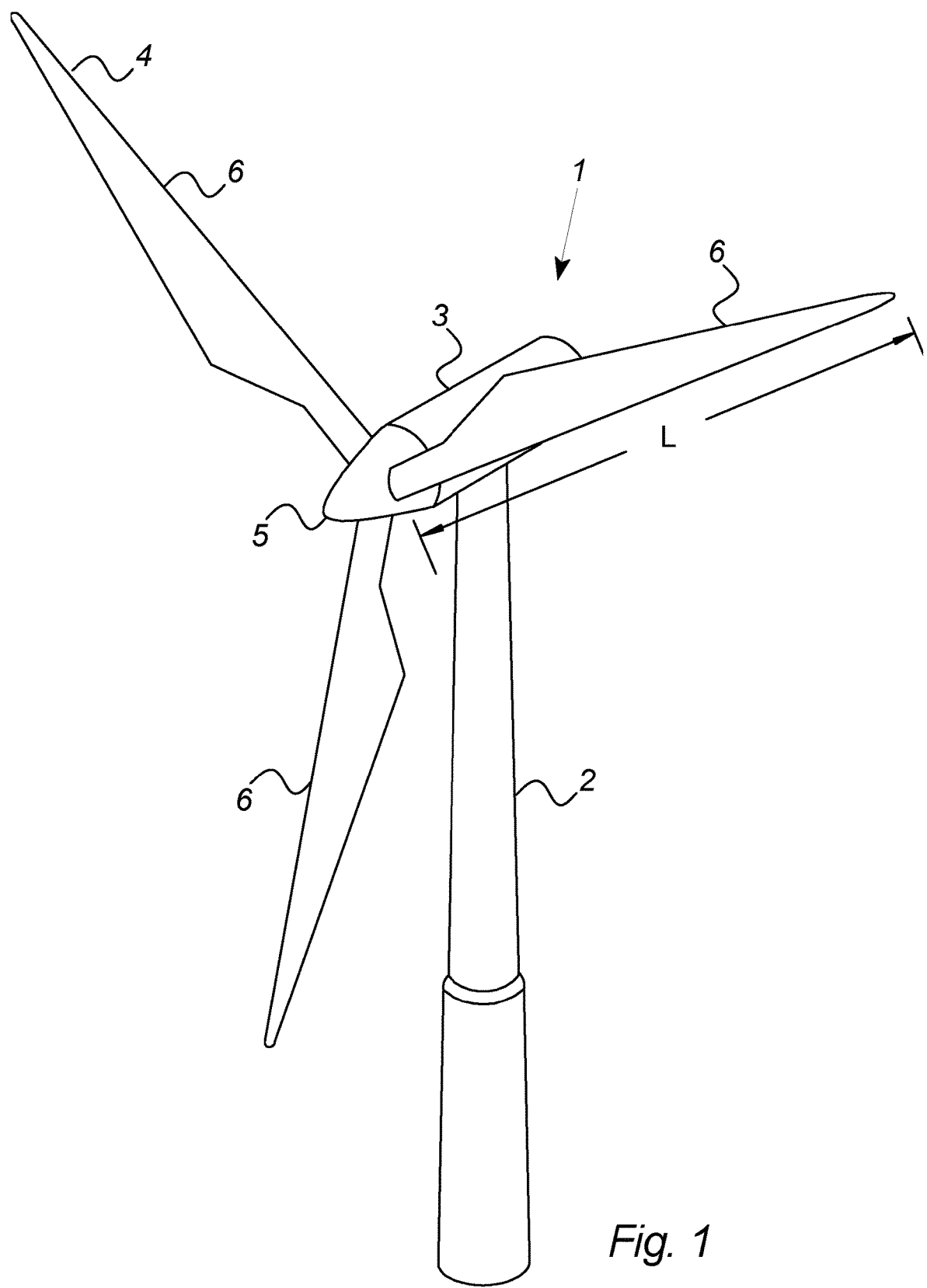
FIG. 1 is an isometric perspective view of a modern wind turbine with three wind turbine blades.

FIG. 1 illustrates an isometric perspective view of a modern wind turbine 1 that comprises a wind turbine tower 2 and a wind turbine nacelle 3 mounted on the tower 2. A rotor 4 of the wind turbine includes a wind turbine hub 5 and three wind turbine blades 6 extending radially from the hub. Each of the blades 6 have a length denoted L.

Figure 2:
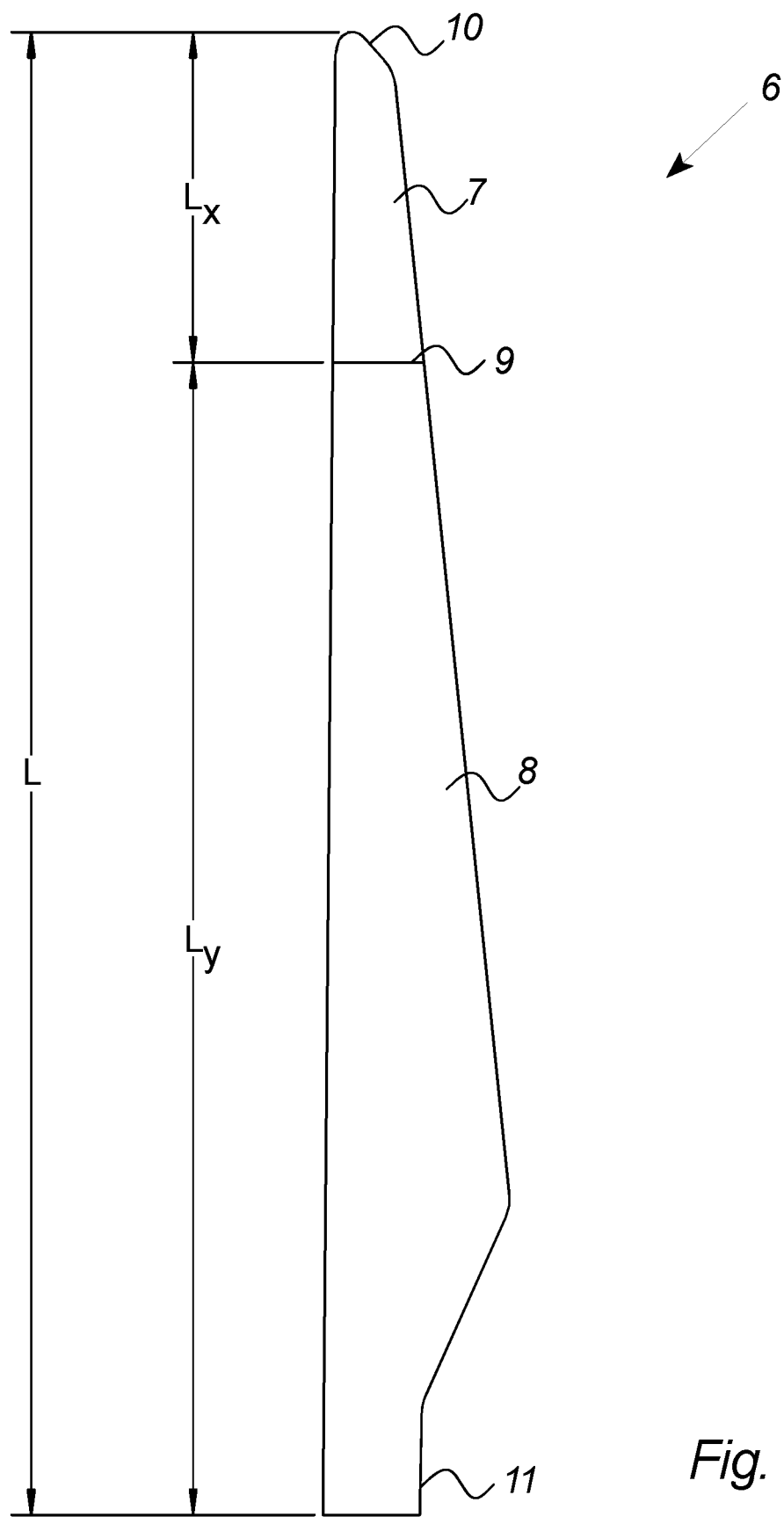
FIG. 2 is a view from above of a sectional wind turbine blade.

FIG. 2 illustrates a view from above of a sectional wind turbine blade 6 wherein the illustrated blade is ready for use in the rotor of a wind turbine.

The blade 6 comprises two blade sections 7, 8 wherein the tip blade section 7 includes the blade tip 10 and the root blade section 8 includes the blade root 11. The tip blade section 7 and the root blade section 8 have lengths $L_x$ and $L_y$, respectively wherein the two lengths add up to the full length of the blade L. However, the blade 6 may also be divided into three or more sections such as tip, mainboard and root sections.

A joint between the two blade sections 7, 8 is established in an area of connection 9. The joint between sections may be an adhesive connection between surfaces in the strengthening structures of the blade sections and/or may include separate key pieces or layups as well as recesses in the area of connection of the blade sections.

Examples of joints between blade sections and a method for manufacturing a modular wind turbine blade are further described below in connection with FIG. 8 and examples of joints are also further disclosed in the above mentioned international patent application no. 2015/189338.

Figure 3:
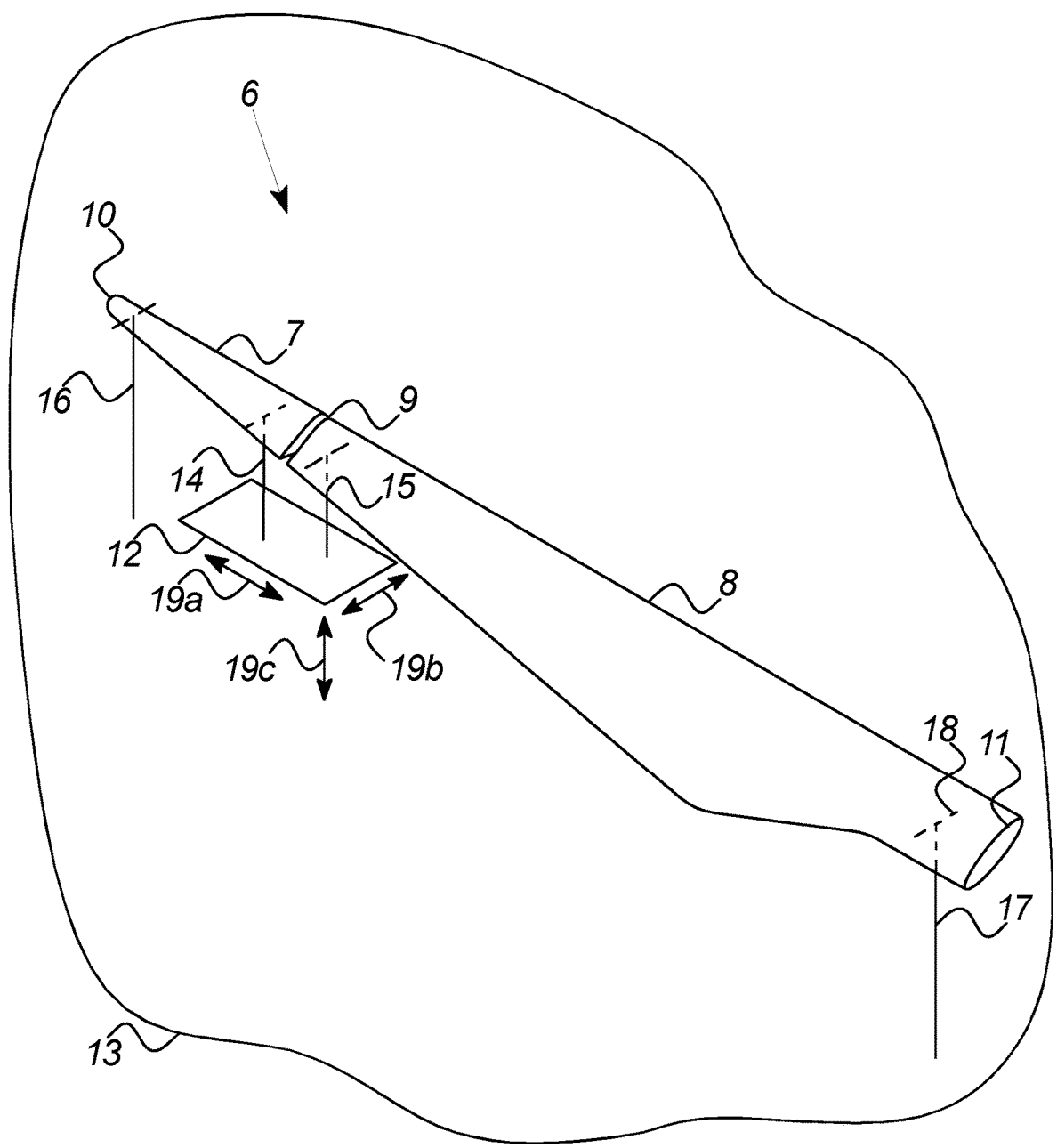
FIG. 3 is a schematic view of an embodiment of the invention involving a system for establishing a wind turbine blade from blade sections at or in proximity of a wind turbine site.

FIG. 3 is a schematic view of an embodiment of the invention involving a system for establishing a sectional or modular wind turbine blade 6 from blade sections 7, 8 for use in the rotor of a wind turbine. The blade sections 7, 8 comprise a tip and root blade section but may also comprise tip, mainboard and root blade sections or even further blade sections for establishing the wind turbine blade.

The blade sections 7, 8 are transported to the site of the wind turbine or to a location in proximity of a wind turbine site e.g. by separate trucks. The blade sections 7, 8 are positioned in support structures after arrival at the destination by a crane or similar lifting means. The blade sections are positioned slightly spaced apart with opposite ends of the blade sections facing each other at the area of connection 9. The ends at the blade tip and root 10, 11 of the blade sections 7, 8 have first and second support stands 16, 17 with top parts 18 shaped to establish firm contact from below with the blade section surfaces. The ends of the blade sections 7, 8 facing each other in the area of connection 9 have first and second support cradles 14, 15 to support the blade sections 7, 8 in pairs with the first and second support stands 16, 17.

The first and second support cradles 14, 15 are standing on a common platform 12. The platform 12 is moveable in one or more directions (as indicated with the arrows 19a-c) until the level of the platform is horizontal.

The platform 12 is preferably made in steel plate material or similar rigid material in providing a solid base for the first and second support cradles 14, 15.

The first and second support stands 16, 17 are illustrated as standing directly on the ground 13 but a support stand 16, 17 may also have an individual steel plate or similar means as a base positioned on the ground 13.

The blade sections 7, 8 are essentially at level when positioned in the sets of support stands and cradles i.e. the tip blade section 7 supported by the set of a first support stand and cradle 14, 16 and the root blade section 8 supported by the set of a second support stand and cradle 15, 17 as illustrated in the figure.

The platform 12 is initially moved e.g. in any of directions 19a-c to ensure a well-defined and exact common base for the first and second support cradles 14, 15 and the blade sections 7, 8 at the area of connection 9. The arrows 19c indicate that the platform 12 may move up and down in relation to the ground 13. The arrows 19a, 19b indicate that the platform 12 may move in longitudinal and perpendicular directions of the wind turbine blade 6/blade sections 7, 8. The platform 12 may also be rotated in relation to a vertical or horizontal axis of the platform (not indicated in the figure).

The blade sections 7, 8 are hereafter aligned at the area of connection 9 by moving the platform 12 and/or the first and second support cradles 14, 15.

A wind turbine blade 6 is finally established by a joint of the blade sections 7, 8 in the area of connection 9 wherein ends of the blade sections 7, 8 face each other. The joining processes are performed by work persons using the platform 12 as a mobile factory.

Figure 4:
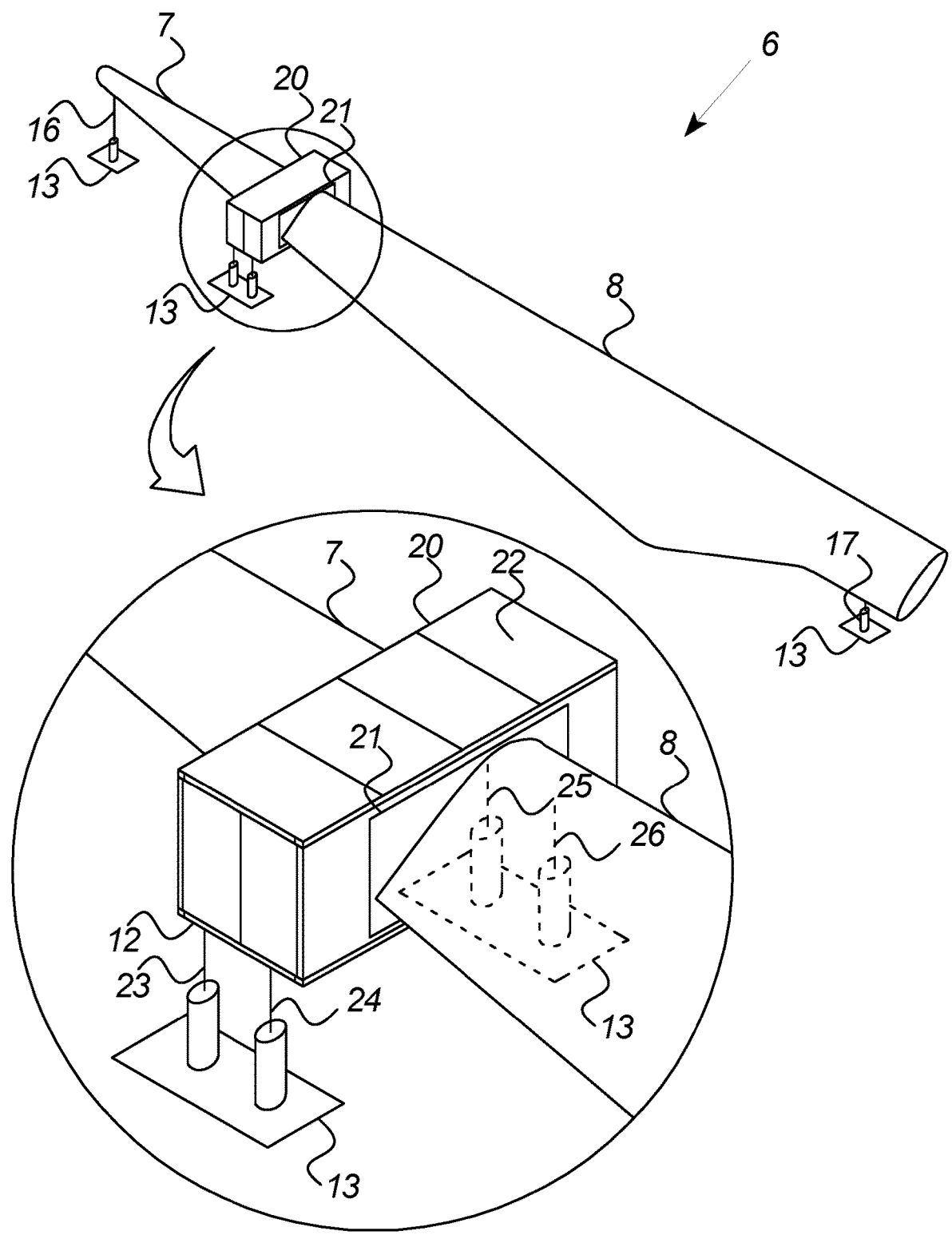
FIG. 4 is an isometric perspective view of an embodiment of the invention involving a mobile factory and system for establishing a wind turbine blade from blade sections.

FIG. 4 is an isometric perspective view of an embodiment of the invention involving the mobile factory 20 as part of the system for establishing a wind turbine blade 6 from blade sections 7, 8.

The mobile factory 20 is illustrated in the figure as a container with the container floor used as a workshop in the platform 12 for work persons. Each of the two container side walls comprises an opening 21 for entering and holding a part of the two blade sections 7, 8 of a sectional wind turbine blade 6. The mobile factory especially holds and encloses the area of connection 9 between the two blade sections 7, 8 (not illustrated in the figure).

The figure and especially the enlargement of a part of the figure illustrate that the blade sections 7, 8 are entered into the container from the sides. The blade sections may enter into the container sides via openings 21 in the container walls or lifted in from above via an opening 22 in the container roof that may fold open. The blade sections 7, 8 will project out of the openings 21 in the side walls of the container when they are ready to be jointed in the mobile factory. The openings in the container side walls may comprise doors and plastic curtains for closing the openings during transport as well as seal the gap around the entered blade sections.

The platform 12 in the mobile factory 20 is supported in the embodiment by first to fourth platform support actuators 23-26. Each platform support actuator has a connection to a platform corner area. The four platform support actuators 23-26 are also resting on the ground 13.

The four platform support actuators 23-26 may especially include hydraulic actuators or jack-ups and/or hydraulic feet for vertical fine positioning of the platform 12. The four platform support actuators 23-26 or some of the four platform support actuators 23-26 may also include wheels with electric drives for moving on the ground in a horizontal fine positioning of the platform 12.

The container of the mobile factory 20 may be a standardised shipping container such as a shipping container of a twenty or forty foot standard length. The container of the mobile factory 20 may also have non-standardised measurements such as a mobile factory created with different length and/or height in relation to the standardised measurements of a shipping container. The mobile factory 20 may also comprise more than one container such as an assembly of two containers side by side or end to end to create a necessary width or length in the mobile factory.

A container used as the mobile factory 20 provides mobility to the mobile factory allowing the mobile factory to be easily moved by truck or train to a site of a wind turbine or to a location in proximity of a wind turbine site wherein blade sections of sectional wind turbine blades are to be jointed. The container also provides mobility in the erection of a wind farm by allowing the mobile factory to be moved with a forklift from one wind turbine sites to another within the wind farm.

The container of the mobile factory 20 may provide internal lifting means such one or more overhead winches e.g. to handle heavy tools and any separate means for joining the blade sections. Means for providing a controlled environment in the area of connection during the joining of the blade sections is also possible in the container such as vacuum, desirable climate such as humidity and temperature and enclosures for fast curing of, for example, adhesive used to bond the blade sections. The container of the mobile factory 20 may also provide all health, security and environment measures for any work persons when the container is in position at the wind turbine site or the proximity location, including an emergency exit and air control inside the container.

Figure 5:
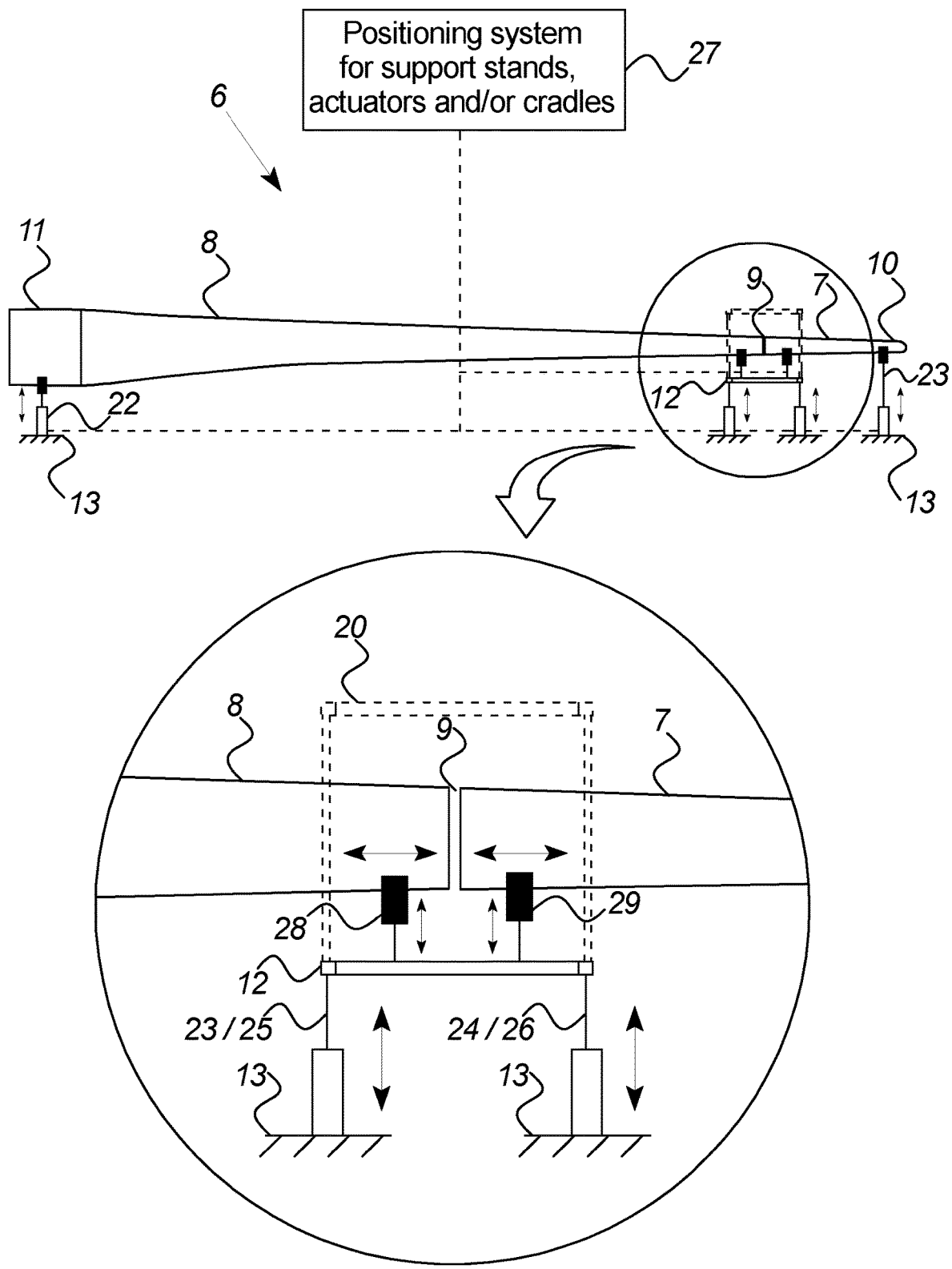
FIG. 5 is a side view of different directions of movement in the system for establishing a wind turbine blade from blade sections.

FIG. 5 is a side view of different directions of movement in a system for establishing a wind turbine blade 6 from blade sections 7, 8 as illustrated in FIG. 3 or FIG. 4.

The figure and especially the enlarged part of the figure illustrate the mobile factory 20 as consisting of a single platform 12 (FIG. 3) or as comprising a container (mostly dotted lines) with the container floor as a platform 12 (FIG. 4).

The blade sections 7, 8 of the wind turbine blade 6 are supported at the tip and root ends by a first and second blade support stand 22, 23. The length of the first and second blade support stand 22, 23 may be controllable in order to lift or lower the blade sections at the tip and root ends.

The platform 12 in the mobile factory 20 is supported in the embodiment by first to fourth platform support actuators 23-26. Each platform support actuator has a connection to a platform corner area. The four platform support actuators 23-26 are also resting on the ground 13. The length of the actuators 23-26 may be controlled individually or altogether to lift or lower the platform 12 in relation to the ground 13. The blade sections 7, 8 of the wind turbine blade 6 are supported at the faced ends in the area of connection 9 by a first and second blade support cradles 28, 29 (corresponding to the first and second blade support cradles 14, 15 in FIG. 3). The first and second blade support cradles 28, 29 are positioned on the platform 12.

The position of the first blade support cradle 28 and/or the second blade support cradle 29 on the platform 12 in the mobile factory may be linearly adjusted e.g. by moving the second blade support cradle 29 while supporting the blade section 7 including the blade tip from an initial position at the opening of the side wall of the container to a position in the centre of the container and hereby creating an area of connection 9 with the already present blade section 8 including the blade root. Moving both blade sections 7, 8 inside the mobile factory to form the area of connection 9 with the first and second blade support cradles 28, 29 is also a possibility.

The first and second blade support cradles 28, 29 may also comprise blade clamps to grab and slightly rotate the blade sections such as a blade clamp for the blade section 7 including the blade tip. The blade clamps may be used in an initial alignment for the blade section ends at the area of connection 9.

The lengths of the first and second blade support cradles 28, 29 are controlled individually to lift or lower each blade section 7, 8 in the alignment process for the blade section ends at the area of connection 9.

The first and second support cradles 28, 29 (as well as the first and second support cradles 14, 15 in FIG. 3) may especially include hydraulic actuators or jack-ups for the fine positioning and alignment of the blade ends at the area of connection 9.

A positioning system 27 is connected to the four platform support actuators 23-26 and may control the levelling of the platform 12 via lifting and lowering the actuators. The first and second blade support stand 22, 23 may also be controlled by the positioning system 27 e.g. by lifting and lowering the blade tip and root as well as activating any wheels with electric drives to participate with the wheels of the actuators in a linear fine positioning of one or both blade sections 7, 8.

The positioning system 27 is also connected to the first and second blade support cradles 28, 29 in the mobile factory and controls the cradles to align the blade sections in relation to each other e.g. by rotation and/or lifting or lowering the blade sections.

The control of the positioning system 27 is preferably performed in response to measurements by alignment sensors such as laser sensors.

Figure 6:
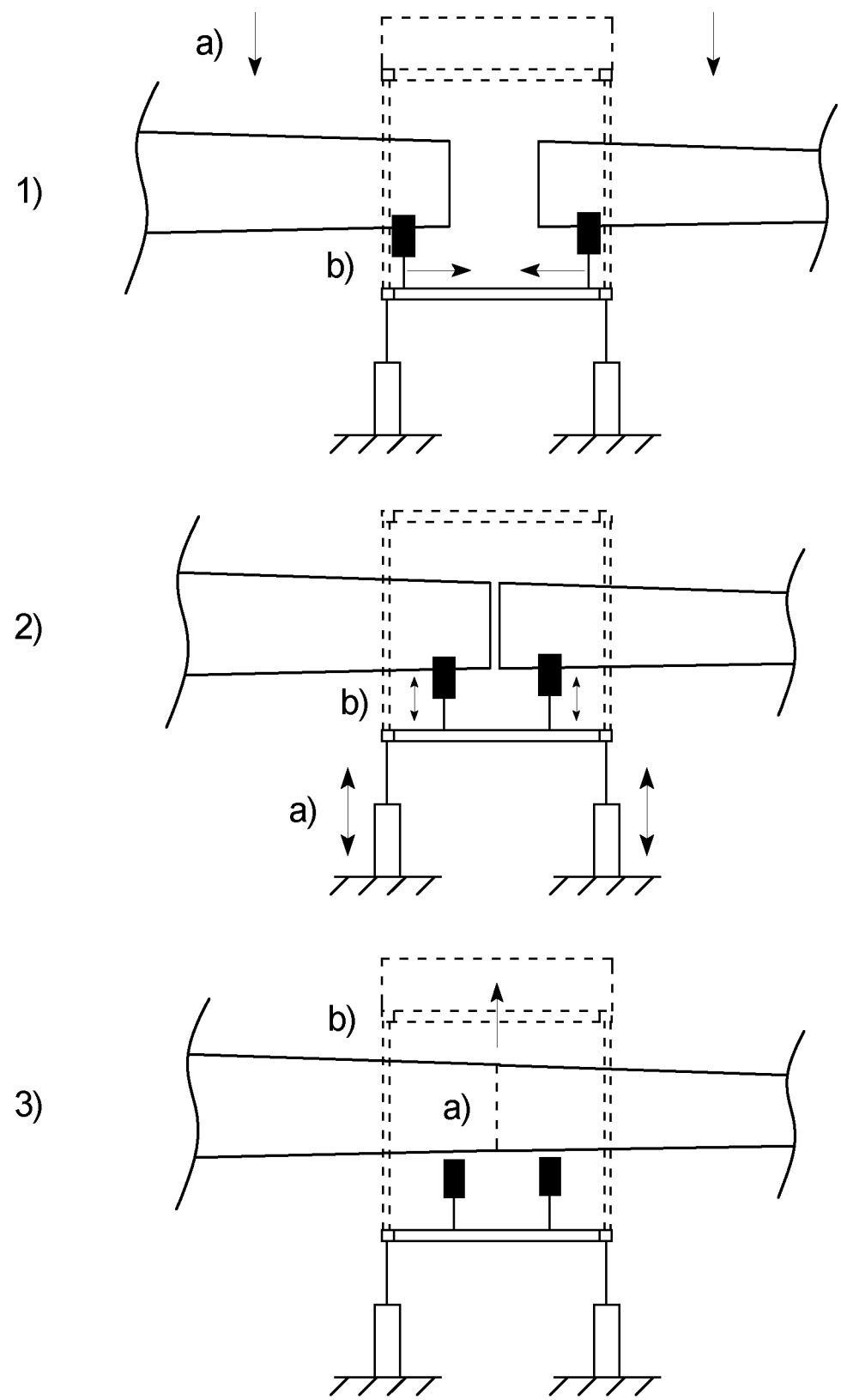
FIG. 6 is a view of method steps in an embodiment of the invention for establishing a wind turbine blade.

FIG. 6 is a view of method steps in an embodiment of the invention for establishing a wind turbine blade 6 from blade sections 7, 8 in a system.

The method steps include manufacturing the blade sections in a manufacturing plant and transporting the blade sections and a mobile factory to a location at or in proximity of a wind turbine site e.g. in separate trucks as well as:

1) positioning of two blade sections in support cradles on moveable platform in the mobile factory.

The two blade sections are positioned in the support cradles with opposite ends of the blade sections facing each other in an area of connection as illustrated in 1a) e.g. with a crane or similar lifting means.

The opposite ends of the two blade sections are brought in close contact in an area of connection as illustrated in 1b).

The blade cradles may comprise electric motors for performing the illustrated horizontal movement of the blade sections into the close contact or the above mentioned lifting means may provide the necessary force for sliding each support cradle and blade section horizontally in to place.

2) arranging of the blade sections in relation to each other with the moveable platform in the mobile factory.

The platform support actuators are moved up or down in order to level the platform as illustrated in 2a).

The blade support cradles are moved up or down in order to align the blade sections with each other in the area of connection as illustrated in 2b).

3) perform a joint in the area of connection between the blade sections at the mobile factory.

The blade sections are jointed at the area of connection in the mobile factory as illustrated in 3a) e.g. by work persons standing on the platform.

The sectional wind turbine blade is lifted away from the mobile factory after being jointed at the area of connection as illustrated in 3b) e.g. with a crane.

Figure 7:
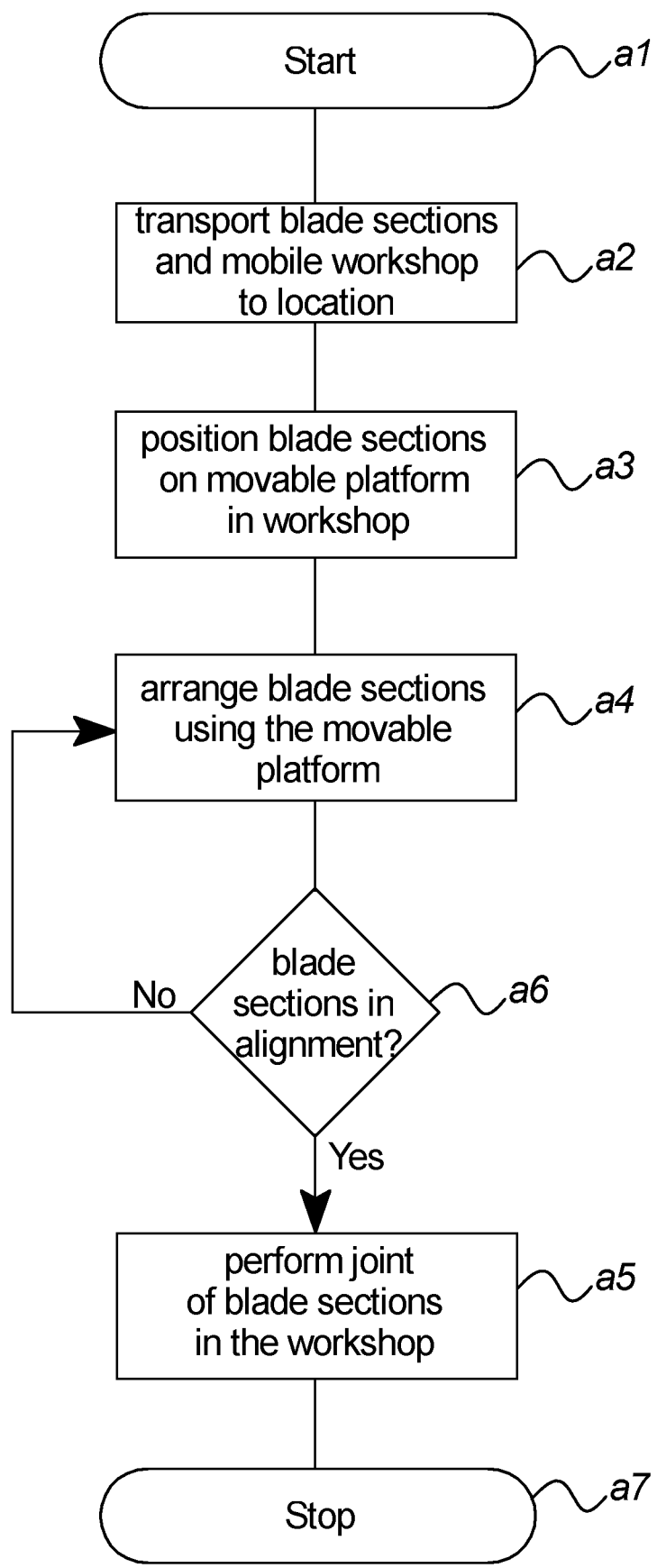
FIG. 7 is a flow diagram of a method for establishing a wind turbine blade according to the invention.

FIG. 7 is a flow diagram of a method for establishing a sectional or modular wind turbine blade according to the invention.

The method includes different method steps including:

Manufacturing and transporting the blade sections of a sectional or modular wind turbine blade and mobile factory to a location at or in proximity of a wind turbine site.

Ends of the blade sections are positioned on a platform in the mobile factory wherein the platform is moveable in relation to the ground at the location.

The blade sections are arranged using the platform wherein the platform is moved to level the platform in relation to the ground. The blade sections are also arranged in support cradles supporting the ends of the blade sections on the platform. The support cradles may lift or lower the ends of the blade sections in the mobile factory to align the blade ends in relation to each other at an area of connection.

Finally, a joint of the aligned blade sections at the area of connection is performed in the mobile factory to establish the sectional or modular wind turbine blade.

Figure 8:
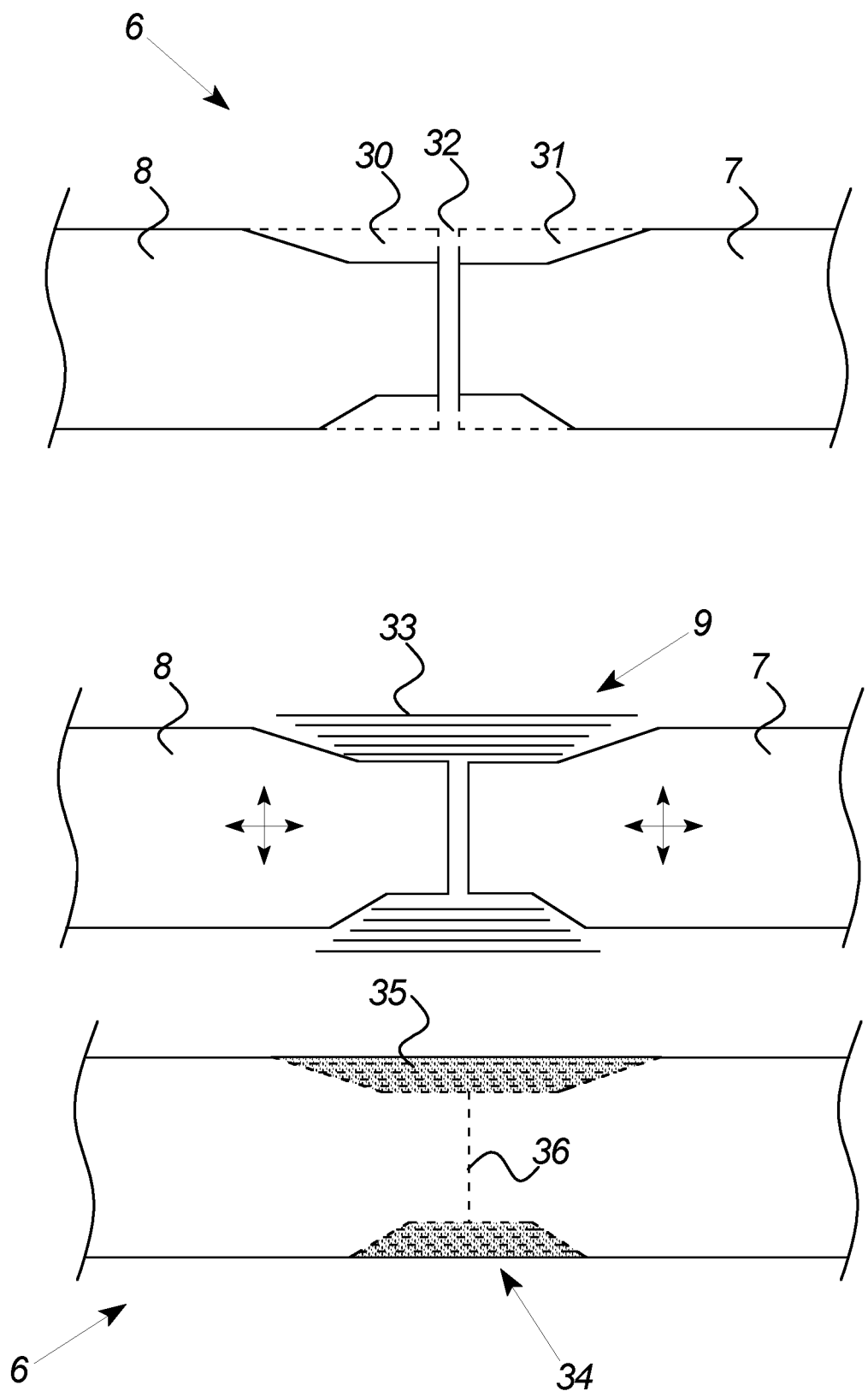
FIG. 8 is schematic illustrations of steps in establishing a wind turbine blade with a joint between blade sections.

FIG. 8 has three schematic illustrations of examples of steps for providing a sectional or modular wind turbine blade in a manufacturing plant and a mobile factory, respectively.

Wind turbine blades may include different types of strengthening structures such as an internal beam as the main provider of strength to the blade. An alternative type of wind turbine blade may include a shell surface and an internal shear web wherein both provide significant strength to the blade.

Only a part of the full length of a wind turbine blade or load-carrying principal laminates is illustrated in FIG. 8 for clarity reasons.

The surface of the connection area 9 of the blade sections may be machined to create exact recess geometry in the upwind side and the downwind side of the wind turbine blade in between the leading and trailing edges. A recess geometry is defined by the strength requirement for a blade joint of sections in a wind turbine blade e.g. by length, depth and shape of the recesses as will be understood by the skilled person.

The upper (first) illustration in FIG. 8 shows that recesses may be provided in the up- and downwind sides of the blade sections. The recesses may be machined into the blade sections after the sections have been manufactured, or the recesses may be built into the sections during manufacture of the sections. The recesses define a joining part/connection area 9 of the blade sections to be joined at the mobile factory.

The machining operations may be done at the manufacturing plant(s) where the blade sections are produced or at the mobile factory or a combination of both.

In one embodiment of the invention, the blade sections are prepared with recesses 31, 32 at the manufacturing facility and moved to the mobile factory substantially ready for joining.

In a further embodiment of the invention, it may be necessary to make adjustments to the recesses at the mobile factory to obtain a suitable connection area 9.

In another embodiment of the invention, most or all of the machining is done at the mobile factory. This may be advantageous to obtain perfect matching of the sections, as tip- and root sections may arrive from different manufacturing plants.

The second and third illustrations in FIG. 8 show different steps in establishing the wind turbine blade from blade sections in a mobile factory at the location at or in proximity of a wind turbine site. At least the connection area 9 of the blade sections are arranged and aligned in the mobile factory e.g. as described above in relation to FIGS. 4 and 5 and subsequently jointed.

The second illustration discloses the steps of a first and second blade section 7, 8 being initially aligned (as schematically illustrated with the arrows) and prepared for joint in the mobile factory. A joint may be established in the connection area 9 after the blade sections have been aligned i.e. the mobile factory includes the necessary tools for aligning and joining the sections such as actuating, hoisting and/or adhering tools.

The blade section 7, 8 are jointed/assembled by arranging layups comprising a plurality of composite fibre plies 33 in recesses 31, 32 formed in the blade or in the load-carrying principal laminates of the wind turbine blade 6. The fibre plies may for example be plies of glass fibre, carbon fibre, hybrids or combinations hereof.

The layup may be provided as a wet layup, i.e. as pre-pregs, or it may be provided as dry fibre-reinforcement material, or a combination thereof. Resin is added to the dry fibre material or additional resin may be added to the pre-preg material, and the resin is subsequently cured or hardened in order to form a composite joint. The resin may be applied by hand lamination or by forming a cavity, e.g. by arranging a vacuum foil across the recesses and layup and injecting or infusing a resin.

The infused resin is preferably an epoxy vinyl ester (VE) resin or an isocyanate based resin.

The composite joint is preferably a plain scarf joint but other types of joints are possible such as a wedged scarf joint or a scarf joint comprising pins.

Other types of joints may be advantageously used, for example male-female joint types, mechanical connections, for example, bolted connections. In any case, the precise alignment of the parts made possible in the mobile factory according to the invention is crucial for the effective and secure joining of wind turbine blade sections at the site of the wind turbine erection or close to this site.

The third illustration discloses the sectional or modular wind turbine blade 6 with a scarf joint 34 in the connection area 9. The layups and hardened resin of the joint are schematically displayed with dotted lines and areas. The illustrated blade is ready for use in the rotor of a wind turbine being erected in a wind turbine site where the mobile factory is located at or in proximity of.

Composite keys may also be included in an extended embodiment for establishing a joint between two blade sections comprising machined geometries with use of the manufacturing plant and the mobile factory.

Separate composite keys are initially made in a machining process at the manufacturing plant. The keys are machined in a shape corresponding to the machined geometries in the blade sections such as separate keys for the up- and downwind sides of the blade.

The different means of two blade sections are initially aligned and connected in the mobile factory including the lightning protection system (LPS) and shear web connection/load-carrying beam. Different positioning pins like the LPS pins may be used to facilitate matching of the blade halves.

The matching position in the mobile factory of the two blade sections is with the downwind key positioned below the sections whilst the upwind key hangs above the sections using actuating and hoisting tools of the mobile factory.

The two blade sections are aligned and connected in a way ready for a vacuum tight joint.

The downwind key is raised with the actuator tools and the upwind key is lowered with the hoist tools into the machined geometries in the blade sections after curing the shear web-connection using a fast-curing composite system.

Tape is applied on all connection areas of the sectional or modular wind turbine blade. The tape is applied on the gelcoat or paint of the outside-interfaces of the blade to cover the connection areas.

Holes are made in the main laminate of the keys with connecting inlets on the lower key in the downwind side and connecting outlets on the upper key in the upwind side.

The two blade sections are ready for a vacuum tight joint e.g. by covering the connection area in vacuum foil or a similar enclosure. A bit of vacuum is applied with vacuum tools by the outlets on the upper side/upwind side e.g. a pressure down to 0.7 bar on the outlet side and an adhesive resin with a low viscosity is infused in inlets on the lower side/downwind side e.g. a VE or isocyanate based resin. The composite keys are hereby adhered with the necessary adhering tools in the machined geometries of the blade sections and participate in establishing a sectional or modular wind turbine blade. The blade is hereafter ready for use in the rotor of a wind turbine being erected in a wind turbine site where the mobile factory is located at or in proximity of.

In the above description, various embodiments of the invention have been described with reference to the drawings, but it is apparent for a person skilled within the art that the invention can be carried out in a number of ways, using e.g. the examples disclosed in the description in various combinations, and within a wide range of variations within the scope of the appended claims.

LIST OF REFERENCE NUMBERS

1. Wind turbine
2. Wind turbine tower
3. Wind turbine nacelle
4. Wind turbine rotor
5. Wind turbine hub
6. Sectional wind turbine blade
7. Tip blade section including the wind turbine blade tip
8. Root blade section including the wind turbine blade root
9. Area of connection between two blade sections
10. Tip section of a wind turbine blade
11. Root section of a wind turbine blade
12. Platform in a mobile factory
13. The ground at the wind turbine site or at a location in proximity of the wind turbine site
14-15. First and second support cradle on a platform for supporting two blade sections at the area of connection
16. First support stand for a blade section at the tip
17. Second support stand for a blade section at the root
18. Top part of a support stand with contact to the blade section surface
19a-c. Arrows indicating possible movement directions of the platform
20. Mobile factory with a platform for supporting blade section ends facing each other and establishing a workshop for work persons
21. Opening in a container wall for receiving a blade section
22. Foldable opening in a container roof
23-26. First to fourth platform support actuators for moving the platform in the mobile factory
27. Positioning system for support stands, actuators and/or cradles
28-29. First and second support cradles for supporting ends of two blade sections at the area of connection
30-31. Machined recesses or geometries in the sides of the two wind turbine blade sections
32. Dividing line between sections of a wind turbine blade.
33. Plurality of fibre plies such as plies of glass fibre, carbon fibre, hybrids or combinations hereof
34. Joint of two blade sections in a connection area such as a scarf joint
35. Fibre plies and hardened resin in the joint of a sectional or modular wind turbine blade
36. Central connection of blade sections such as a shear web connection
a1-a7. Flow diagram
L. Length of a wind turbine blade
$L_x$, $L_y$. Lengths of blade sections

The invention claimed is:

1. A method for establishing a sectional or modular wind turbine blade (6), said method comprises the steps of:
    transporting at least two blade sections (8,7) of said wind turbine blade and a mobile factory (20) for joining blade sections to a location at or in proximity of a wind turbine site;
    positioning said at least two blade sections with two blade section ends facing each other and supported on a common one-piece platform (12) in said mobile factory;
    moving said common one-piece platform in relation to the ground at the location for levelling said common one-piece platform, wherein said common one-piece platform (12) is moved by one or more platform support actuators connected to the common one-piece platform (12) while standing on the ground (13);
    aligning said blade section ends in relation to each other; and
    establishing said sectional or modular wind turbine blade by joining said at least two blade sections in an area of connection (9) at said blade section ends.

2. The method according to claim 1, wherein at least two support cradles (28, 29) on said common one-piece platform support said blade section ends.

3. The method according to claim 2, wherein said blade section ends are aligned in relation to each other by rotating, lifting and/or lowering said at least two support cradles.

4. The method according to claim 2, wherein said at least two support cradles are moveable horizontally on said common one-piece platform.

* * * * *